Aug. 17, 1937.   H. B. HULL   2,090,416
REFRIGERATING APPARATUS
Filed June 21, 1935
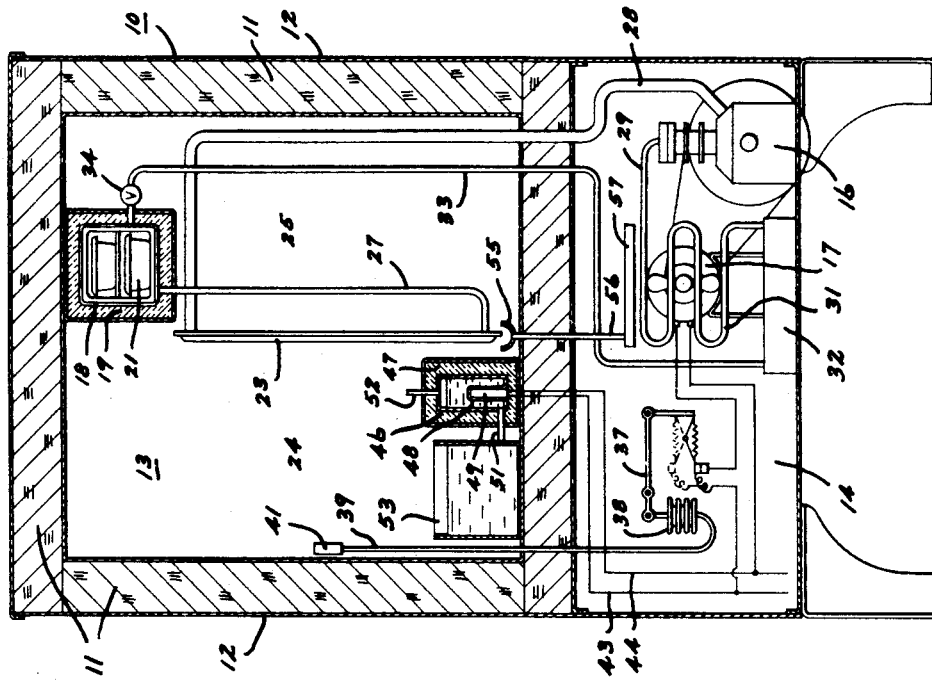
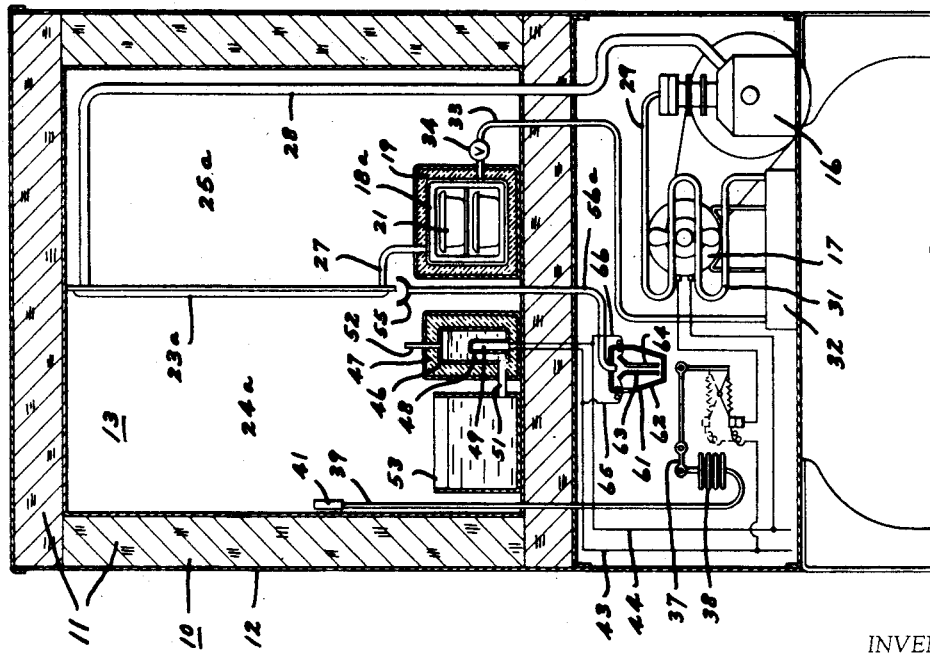
INVENTOR.
HARRY B. HULL.
BY
Spencer, Hardman and Fehr.
HIS ATTORNEYS.

Patented Aug. 17, 1937

2,090,416

UNITED STATES PATENT OFFICE 2,090,416

REFRIGERATING APPARATUS

Harry B. Hull, Dayton, Ohio, assignor to General Motors Corporation, Dayton, Ohio, a corporation of Delaware Application June 21, 1935, Serial No. 27,716

15 Claims. (Cl. 62—89)

This invention relates to refrigeration and particularly to refrigerating apparatus wherein the air within the refrigerated compartment thereof is conditioned.

I am aware that others have provided means for increasing the humidity, or the moisture content, of air within a food storage compartment of a mechanically refrigerated cabinet. For example, water sprays, etc., have been provided within the food storage compartment of mechanically refrigerated cabinets for preventing food products from becoming dried out and for preventing odors and flavors of certain food products from mixing with and contaminating other foods. Of the constructions for this purpose known to me none can be considered portable refrigerators due to the necessity of providing permanent water pipe or conduit connections leading from the refrigerator cabinet to a drain located remote from the cabinet and from a source of water supply to the refrigerator cabinet.

An object of my invention is to provide a portable refrigerator cabinet with an apparatus for conditioning air within the food storage compartment thereof.

Another object of my invention is to provide an improved mechanically refrigerated cabinet having means for increasing the moisture content of the air or maintaining a predetermined humidity within the food storage compartment thereof.

A further object of my invention is to arrange an element or elements of a refrigerating system in a food storage chamber of a refrigerator cabinet in such manner that the chamber will be divided into a compartment adapted to be maintained at a high humidity and a compartment adapted to be maintained at a relatively lower humidity.

A still further object of my invention is to provide means for disposing of drip water flowing from a cooling element located in a compartment of a refrigerator cabinet which has the air therein treated or conditioned without the necessity of conveying the moisture through permanent pipe connections leading from the cabinet to a drain remote therefrom.

In carrying out the foregoing objects it is a still further object of my invention to provide means for conveying drip water flowing from a cooling element located within an air treated food storage compartment of a refrigerating apparatus to the exterior of the compartment and to evaporate the removed water.

Further objects and advantages of the present invention will be apparent from the following description, reference being had to the accompanying drawing, wherein a preferred form of the present invention is clearly shown.

In the drawing:

Fig. 1 is a vertical sectional view through a refrigerator cabinet having my invention embodied therein; and Fig. 2 is a vertical sectional view through a refrigerator cabinet having another form of my invention embodied therein.

Referring to the drawing, for the purpose of illustrating my invention, I have shown in Fig. 1 thereof a refrigerator cabinet of the portable household type which can be moved from one locality to another by simply disconnecting the electrical cord leading thereto and which is generally designated by the reference character 10. Cabinet 10 includes a plurality of insulated walls 11 supported by a metal shell or a plurality of panels 12 which form the exterior surface of cabinet 10. The walls 11 are lined with a metal member which forms a food storage chamber 13 and the metal panels 12 extend beyond the lowermost portion of chamber 13 to form walls of a machine compartment 14 below the insulated chamber and in which a refrigerant liquefying and circulating unit of a closed refrigerating system is mounted. The chamber 13 is provided with the usual door opening for providing access thereto and a door for closing the opening (not shown). The closed refrigerating system associated with cabinet 10 comprises a compressor 16 operatively connected, through suitable belt and pulley connections, to an electric motor 17. A cooling element or evaporator 18 is located within the food storage chamber 13 and is preferably insulated as at 19 from the air within chamber 13 and arranged to form walls of a sharp freezing compartment adapted to receive trays 21 for the making of ice cubes. A second cooling element or evaporator 23 preferably of the flat sheet metal plate type is adapted to be vertically mounted near the center of chamber 13. The evaporator 23 has its upper edge lying along and in closely spaced relation to the one corner of the box formed by the insulation 14 around evaporator 18. The lower end of evaporator 23 terminates at a point slightly spaced from the bottom of chamber 13. It will be noted that the close proximity of the evaporators 18 and 23 to one another or the close proximity of evaporator 23 to the walls 11 divide the chamber 13 into two food storage compartments 24 and 25. A pipe or conduit 27 connects evaporator 18 with evaporator 23 in series relation in the refrigerating system.

Operation of compressor 16 withdraws gaseous refrigerant from evaporator 23 through a pipe 28 and compresses the vaporized refrigerant and forces same, under pressure through a pipe 29, into the condenser 31 where the compressed refrigerant is cooled and liquefied in any well-known manner. The liquefied refrigerant flows into a reservoir 32 where it is stored prior to its flow through a pipe 33 to evaporator 18. An expansion device or valve 34 is interposed in the liquid refrigerant supply pipe 33 adjacent evaporator 18 and this device or valve controls the flow of liquid refrigerant into the evaporator 18. Refrigerant flowing through the valve 34 passes through suitable passages provided in evaporator 18 where it absorbs heat from the contents of trays 21 and causes a portion of the refrigerant to vaporize. Ordinarily there is more liquid refrigerant permitted to enter evaporator 18 than can be vaporized therein and this excess liquid refrigerant passes through pipe 27 to suitable passages provided in evaporator 23 for causing evaporator 23 to produce a cooling effect sufficient to cool the air and consequently food products stored in the compartments 24 and 25 of chamber 13. The arrangement of the evaporators and flow of refrigerant therethrough as herein disclosed are well-known to those skilled in the art and it is obvious that evaporator 18 will be maintained at a much lower temperature than the temperature of evaporator 23.

The operation of motor 17, and consequently compressor 16 of the refrigerant liquefying and circulating unit, is controlled by any suitable or conventional snap acting switch 37 having contacts interposed in an electric circuit leading to the motor. A bellows 38, having a pipe connection 39 to a thermostatic bulb 41, is employed to actuate switch 37. The bulb 41 is positioned in chamber 13 and a volatile fluid contained therein is responsive to temperatures in the chamber for causing expansion and contraction of the bellows 38 to actuate switch 37. Obviously the thermal bulb 41 thereby tends to maintain the evaporators 18 and 23 and chamber 13 between predetermined temperature limits by controlling operation of motor 17 and consequently compressor 16. The electric supply lines leading to switch 37 and motor 17 have branch wires 43 and 44 extending therefrom for a purpose to be presently described.

Since it is well known that in order to cool food products stored within chamber 13 of cabinet 10 to any appreciable degree the temperature of air therein must be reduced below the dew point of moisture contained in the air. This causes moisture to be withdrawn from the air in compartments 24 and 25 and from food products stored therein. The moisture accumulates on walls of the evaporator 23 thus creating a so-called drying action of the foods. Others have provided means for supplying moisture to the air within a food storage compartment of a refrigerator cabinet to increase the humidity of the air so as to prevent drying of the foods. Such means have included means for removing contaminated moisture from the refrigerated compartment and for supplying fresh uncontaminated air to the compartment and ordinarily a plurality of permanent pipe connections extending to and from the refrigerator cabinet. My invention particularly relates to this type of apparatus and particularly to a portable apparatus such, for example, as small household refrigerator cabinets or cabinets for installation in compartments which cabinets can be readily moved from one location to another. The apparatus of my invention is therefore provided with means for increasing the humidity of air within the chamber 13 or for maintaining same substantially constant. This means in the present disclosure comprises a closed tank or receptacle 46 disposed within chamber 13 and surrounded by any suitable insulating material 47. The receptacle 46 has a portion of its bottom directed upwardly as at 48 so as to provide a well or pocket for the reception of an electric heating unit 47 to which the branch power lines 43 and 44 are connected. Tank 46 has an inlet pipe connection 51 and an outlet pipe 52. Pipe 51 extends from tank 46 to a supply reservoir or container 53 which may be closed or covered by any suitable door or lid (not shown). Water is placed in the reservoir or container 53 and this water flows through the pipe 51 into tank 46 where it attains a level corresponding to the level thereof in reservoir 53. The electric heater 49 is energized as long as the power circuit leading to switch 37 is closed and causes evaporation or vaporization of water from tank 46. The water flows through the outlet pipe 52 in the form of vapor and enters the compartment 24 of chamber 13 where it is cooled and caused to condense in the form of moisture on food products and on the evaporator 23. Moisture accumulating on evaporator 23 flows therefrom, during non-operating periods of the refrigerant liquefying and circulating unit, and is received in an elongated trough 55 located beneath the evaporator. A pipe 56 conveys the drip water caught in trough 55 from chamber 13 and directs the water into any suitable evaporating receptacle 57 located within the machine compartment 14 of cabinet 10. The receptacle 57 is thereby exposed to heat generated by the refrigerant liquefying and circulating unit mounted in compartment 14 and this heat causes evaporation of the drip water from receptacle 57. If desired receptacle 57 may be built in intimate thermal contact with the compressor 16 or condenser 31, so as to expose water contained therein to a more intense heat for obtaining an increased rate of evaporation thereof. The heater 49 vaporizes water from tank 46 and the water vapor flows into the refrigerated chamber 13 to maintain a predetermined humidity within the food storage compartment 24. In addition the refrigerating system continues to cyclically operate under control of switch 37 to cause evaporators 18 and 23 to produce a refrigerating effect. While I have shown the moisture supplying device, comprising the water vaporizing tank 46, heater 49 and reservoir 53, as being positioned within the chamber 13 of cabinet 10 it is to be understood that these elements may be located outside the insulated chamber 13 with the vapor outlet pipe 52 extending into the chamber. The moisture supply device may, if desired, be built within the insulated walls 11 of cabinet 10.

The feature of locating the evaporator 23 so that it divides chamber 13 into the food storage compartments 24 and 25 and so as to afford a limited circulation of air between the compartments provides the cabinet 10 with two food storage compartments of a different humidity relative to one another. For example, compartment 24 will, due to the blocked off or restricted air flow between the compartments, be of higher humidity than compartment 25. Therefore food products which are required to be stored in cool air of high humidity or moisture content may be placed in compartment 24 while other foods not required to be stored in such high humidity may be placed in compartment 25. The two compartments 24 and 25 are of course adapted to have any number of vertically spaced apart and horizontally disposed food supporting shelves mounted therein.

In the modified form of my invention disclosed in Fig. 2 of the drawing I show a different arrangement of the evaporators 18a and 23a. In this showing of my invention the evaporator 18a is located in the lower part of chamber 13 and the plate type evaporator 23a is positioned adjacent the inner surface of the top wall of chamber 13, so as to substantially block off circulation of air at the top of evaporator 23 between the compartments 24a and 25a. In this form of the invention an electrical heat device generally represented by the reference character 61 is utilized for causing evaporation of the drip water flowing from the trough 55. The water evaporating device 61 comprises a vented receptacle 62 having a pair of contacts or electrodes 63 and 64 positioned in the receptacle in spaced apart relation to one another and connected by wires 65 and 66 respectively to the wires 43 and 44. The pipe 56a connected to trough 55 extends into the vented receptacle 62 for the purpose of discharging water from trough 55 into the receptacle. The drip water upon bridging or contacting both electrodes 63 and 64 in receptacle 62 completes the electric circuit through wires 65 and 66 and causes heat to be generated by the resistance of the water to the flow of electric current therethrough and consequently the water vaporizes or evaporates into the atmosphere outside the refrigerated food storage chamber 13. The water evaporating device 61 is therefore normally ineffective and rendered effective by the flow of water from evaporator 23a into trough 55 and through pipe 56a thereinto. The drip water evaporating device 61 thereby insures disposal of drip water from evaporator 23a and prevents this drip water from reentering the insulated chamber 13.

From the foregoing it will be seen that I have provided improved refrigerating apparatus wherein air within the food storage compartment thereof is treated or maintained at a predetermined moisture content for the purpose of preventing drying of the food and transference of odors or flavors from certain food products to certain other of the foods to thereby prevent contamination thereof. My invention permits the use of devices for treating air within refrigerated food storage compartments of portable refrigerating apparatus and provides an apparatus of this type with two food storage compartments for the storage of certain food products. The apparatus removes moisture from the air which moisture is ordinarily contaminated by odors and flavors of the foods and conveys the contaminated moisture out of the food storage compartments of the apparatus where it is prevented from reentering the food chamber. My apparatus evaporates the contaminated drip water flowing therefrom while at the same time supplying fresh uncontaminated moisture to the refrigerated food compartment.

While the forms of embodiment of the invention as herein disclosed, constitute preferred forms, it is to be understood that other forms might be adopted, all coming within the scope of the claims which follow.

What is claimed is as follows:

1. In a refrigerator, a cabinet having a chamber formed therein, a cooling element of a refrigerating system located in and dividing said chamber into a plurality of food storage compartments, said cooling element being adapted to withdraw moisture from the air within both of said plurality of food storage compartments, and means for humidifying the air within one of said compartments to thereby provide the refrigerator cabinet with a food storage compartment having air of high humidity therein and a food storage compartment having air of low humidity therein.

2. In a refrigerator, a cabinet having a chamber formed therein, a cooling element of a refrigerating system located in and dividing said chamber into a plurality of food storage compartments, said cooling element being adapted to withdraw moisture from the air within both of said plurality of food storage compartments and to have moisture dripping therefrom, means for humidifying the air within one of said compartments, means for catching the drip water flowing from said cooling element and for conveying the drip water to the exterior of said chamber, and means for evaporating the water removed from said chamber.

3. In a refrigerator, a cabinet having a chamber formed therein, a cooling element of a refrigerating system located in and dividing said chamber into a plurality of food storage compartments, said cooling element being adapted to withdraw moisture from the air within both of said plurality of food storage compartments and to have moisture dripping therefrom, means for humidifying the air within one of said compartments, means for catching the drip water flowing from said cooling element and for conveying the drip water to the exterior of said chamber, and means normally ineffective and rendered effective by a predetermined amount of water conveyed from said chamber for heating and causing evaporation of the water removed from the chamber.

4. In a refrigerator, a cabinet having a chamber formed therein, a flat plate-like cooling element of a refrigerating system vertically disposed in and dividing said chamber into two food storage compartments, said cooling element being adapted to withdraw moisture from the air within both of said food storage compartments, and means for humidifying the air within one of said compartments to thereby provide the refrigerator cabinet with a food storage compartment having air of high humidity therein and a food storage compartment having air of low humidity therein.

5. In a refrigerator, a cabinet having a chamber formed therein, a flat plate-like cooling element of a refrigerating system vertically disposed in and dividing said chamber into two food storage compartments, said cooling element being adapted to withdraw moisture from the air within both of said food storage compartments and to have moisture dripping therefrom, means for humidifying the air within one of said compartments, means for catching the drip water flowing from said cooling element and for conveying the drip water to the exterior of said chamber, and means for evaporating the water removed from said chamber.

6. In a refrigerator, a cabinet having a chamber formed therein, a flat plate-like cooling element of a refrigerating system vertically disposed in and dividing said chamber into two food storage compartments, said cooling element being adapted to withdraw moisture from the air within both of said food storage compartments and to have moisture dripping therefrom, means for humidifying the air within one of said compartments, means for catching the drip water flowing from said cooling element and for conveying the drip water to the exterior of said chamber, and normally ineffective means rendered effective by a predetermined amount of water conveyed from said chamber for heating and causing evaporation of the water removed from the chamber.

7. In a refrigerator, a cabinet having a chamber formed therein, a cooling element of a refrigerator system located in and dividing said chamber into two food storage compartments, said cooling element being adapted to cool air within both of said compartments and to withdraw moisture therefrom, and a water vapor generating device for supplying moisture to the air within one of said compartments to thereby provide the refrigerator cabinet with a food storage compartment having air of high humidity therein and a food storage compartment having air of low humidity therein.

8. In apparatus for conditioning air in portable refrigerators adapted to be moved from one locality to another at will, a cooling element of a refrigerating system for chilling the air and precipitating contaminated moisture therefrom, means for removing the precipitated moisture from the refrigerator and out of contact with the air therein to prevent reintroduction of the contaminating matter into the refrigerator, normally ineffective means rendered effective automatically by a predetermined amount of moisture conveyed from the refrigerator for evaporating the precipitated moisture removed from the refrigerator, and means for supplying fresh uncontaminated moisture to the dried air within the refrigerator.

9. In apparatus for conditioning air in portable refrigerators adapted to be moved from one locality to another at will, a cooling element of a refrigerating system for chilling the air and precipitating contaminated moisture therefrom, means for removing the precipitated moisture from the refrigerator and out of contact with the air therein to prevent reintroduction of the contaminating matter into the refrigerator, normally ineffective means rendered effective automatically by a predetermined amount of moisture conveyed from the refrigerator for evaporating the precipitated moisture removed from the refrigerator, and an electrically heated water vaporizer for supplying fresh uncontaminated moisture to the dried air within the refrigerator in the form of vapor.

10. In a portable refrigerator, a cabinet having a chamber formed therein, a plurality of evaporators of a refrigerating system disposed in said chamber and cooperating with one another to divide said chamber into an ice freezing compartment and two food storage compartments, one of said evaporators being adapted to cool and withdraw moisture from the air within both of said food storage compartments, means carried by said cabinet for humidifying the air within one of said food compartments to thereby provide the refrigerator cabinet with a food storage compartment having air of high humidity therein and a food storage compartment having air of low humidity therein, and said evaporator forming said ice freezing compartment being located within the food storage compartment having the low humidity air therein.

11. In a portable refrigerator, a cabinet having a chamber formed therein, an evaporator of a refrigerating system disposed in said chamber and dividing same into a plurality of food storage compartments, a second evaporator connected in series relation with the said first evaporator and formed to provide an ice freezing compartment in one of said food storage compartments, said first named evaporator being adapted to cool the air within both of said food storage compartments and to withdraw moisture therefrom, means for humidifying the air within one of said food compartments, said first named evaporator collecting moisture thereon and having water dripping therefrom, means for conveying the moisture dripping from said first named evaporator to the exterior of said chamber, and means for evaporating the drip water removed from said chamber.

12. In a portable refrigerator, a cabinet having a chamber formed therein, an evaporator of a refrigerating system disposed in said chamber and dividing same into a plurality of food storage compartments, a second evaporator connected in series relation with the said first evaporator and formed to provide an ice freezing compartment in one of said food storage compartments, said first named evaporator being adapted to cool the air within both of said food storage compartments and to withdraw moisture therefrom, means for humidifying the air within one of said food compartments, said first named evaporator collecting moisture thereon and having water dripping therefrom, means for conveying the moisture dripping from said first named evaporator to the exterior of said chamber, and means normally ineffective and rendered effective by the flow of drip water from said chamber for heating and evaporating the drip water exteriorly of said chamber.

13. In apparatus for conditioning air in refrigerators, means for chilling the air and precipitating contaminated moisture therefrom, means for removing the precipitated moisture from the refrigerator and out of contact with the air therein to prevent reintroduction of the contaminating matter into the refrigerator, normally ineffective means rendered effective by a predetermined amount of water conveyed from the refrigerator for heating and causing evaporation of the water removed from the refrigerator, and means for supplying fresh uncontaminated moisture to the dried air within the refrigerator.

14. In apparatus for conditioning air in refrigerators, means for chilling the air and precipitating contaminated moisture therefrom, means for removing the precipitated moisture from the refrigerator and out of contact with the air therein to prevent reintroduction of the contaminating matter into the refrigerator, normally ineffective means rendered effective by a predetermined amount of water conveyed from the refrigerator for heating and causing evaporation of the water removed from the refrigerator, and means for supplying fresh uncontaminated moisture in the form of vapor to the dried air within the refrigerator.

15. In combination, a unitary apparatus including a compartment and an element exposed to air within said compartment for chilling the air and precipitating moisture therefrom, means for circulating a cooling medium through said chilling element to cause same to precipitate moisture from the air in said compartment, means for removing the precipitated moisture from said compartment out of contact with air therein to prevent reintroduction of the precipitated moisture into the compartment, a supply of fresh water so associated with said apparatus as to make for its portability, and means for heating a portion of the fresh water and for conducting same to the air within said compartment in the form of vapor.

HARRY B. HULL.